US012603849B2

(12) United States Patent
Han et al.

(10) Patent No.: US 12,603,849 B2
(45) Date of Patent: Apr. 14, 2026

(54) METHOD AND APPARATUS FOR UPDATING PACKET PROCESSING RULE AT HIGH SPEED IN SDN NETWORK ENVIRONMENT

(71) Applicant: Samsung Electronics Co., Ltd., Suwon-si (KR)

(72) Inventors: Yoonseon Han, Suwon-si (KR); Dongmyung Kim, Suwon-si (KR); Sunghwan Kim, Suwon-si (KR); Younggyoun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 18/397,337

(22) Filed: Dec. 27, 2023

(65) Prior Publication Data

US 2024/0223507 A1      Jul. 4, 2024

(30) Foreign Application Priority Data

Jan. 4, 2023      (KR) ......................... 10-2023-0001200

(51) Int. Cl.
H04L 47/62      (2022.01)
H04L 47/32      (2022.01)
(52) U.S. Cl.
CPC .......... H04L 47/6205 (2013.01); H04L 47/32 (2013.01)
(58) Field of Classification Search
None
See application file for complete search history.

(56) References Cited

U.S. PATENT DOCUMENTS 6,700,869 B1 * 3/2004 Falco ..................... H04L 47/24
370/428
9,736,057 B2 8/2017 Chinni et al.
9,894,000 B2 2/2018 McCormick
(Continued)

FOREIGN PATENT DOCUMENTS

CN      109996300 B      7/2019
KR      10-2017-0110106 A      10/2017

OTHER PUBLICATIONS

Ya et al., Hindawi, Mobile Information Systems, A Review of P4 Programmable Data Planes for Network Security, vol. 2021, Article ID 1257046, 24 pages https://doi.org/10.1155/2021/1257046.
(Continued)

*Primary Examiner* — Fadi Haj Said
(74) *Attorney, Agent, or Firm* — Jefferson IP Law, LLP

(57)      ABSTRACT

The disclosure relates to a 5G or 6G communication system for supporting a higher data transmission rate. A method performed by a first network entity in a wireless communication system is provided. The method includes receiving, from a second network entity, a first message including information on at least one of a type, a size, or an identifier of an action buffer, which is for creating of the action buffer, receiving, from the second network entity, a second message including the identifier for adding of at least one action to multiple memories assigned to the action buffer created based on the first message, and performing an arbitrary action for an input packet based on an address of memory in which the arbitrary action among the at least one action is stored.

20 Claims, 14 Drawing Sheets

(56)           References Cited

U.S. PATENT DOCUMENTS

| | | | |
|---|---|---|---|
| 10,291,555 | B2 | 5/2019 | K et al. |
| 2014/0331280 | A1 | 11/2014 | Porras et al. |
| 2017/0272367 | A1* | 9/2017 | Kozat ..................... H04L 47/24 |
| 2021/0182169 | A1 | 6/2021 | Mardente et al. |
| 2022/0353336 | A1* | 11/2022 | Cañete Martinez .. H04W 76/10 |

OTHER PUBLICATIONS

Open Networking Foundation; P4 and P4Runtime Technical Introduction and Use Cases for Service Providers, Open Networking Summit, Sep. 27, 2018.
Carlos et al., UPC Telematics Department; Software Defined Networking (SDN) with OpenFlow 1.3, Open vSwitch and Ryu.

\* cited by examiner

Packet In

Packet out

Create and manage action buffer
Action buffer ID : a_buffer1
Buffer Type :  RingBuffer
Pop_count : 1
Push_count : 1 pop_address = 1       push_address = 6

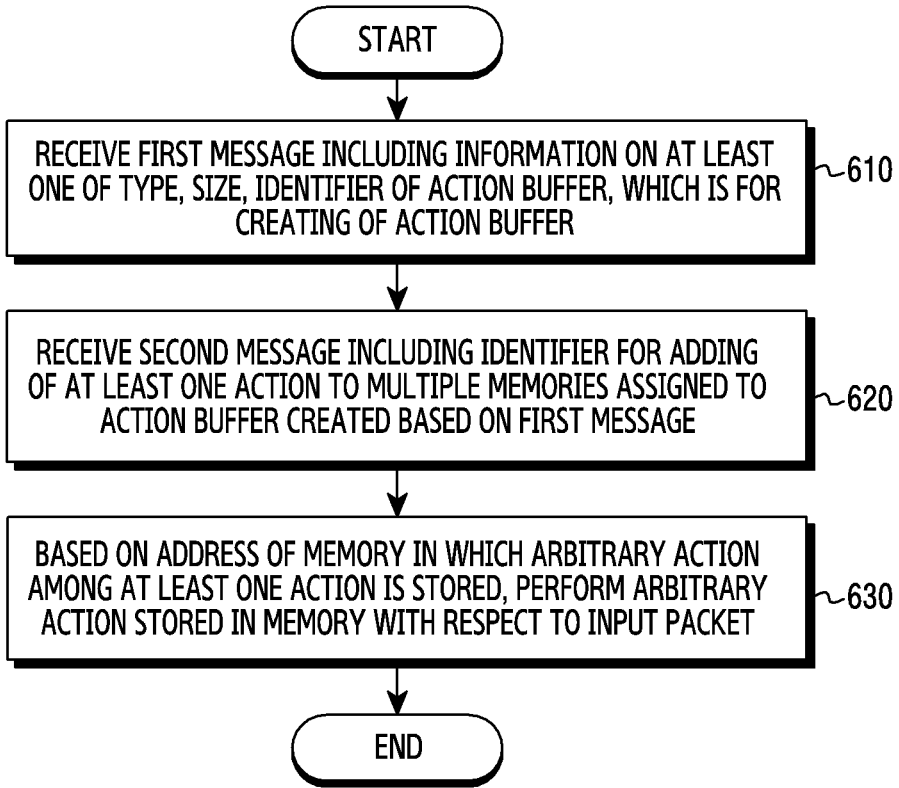

START

RECEIVE FIRST MESSAGE INCLUDING INFORMATION ON AT LEAST ONE OF TYPE, SIZE, IDENTIFIER OF ACTION BUFFER, WHICH IS FOR CREATING OF ACTION BUFFER  ~610

RECEIVE SECOND MESSAGE INCLUDING IDENTIFIER FOR ADDING OF AT LEAST ONE ACTION TO MULTIPLE MEMORIES ASSIGNED TO ACTION BUFFER CREATED BASED ON FIRST MESSAGE  ~620

BASED ON ADDRESS OF MEMORY IN WHICH ARBITRARY ACTION AMONG AT LEAST ONE ACTION IS STORED, PERFORM ARBITRARY ACTION STORED IN MEMORY WITH RESPECT TO INPUT PACKET  ~630

END

FIG.6

Time

Write in action buffer          : {1, 2, 1}

```
//      Add an mTag to the packet; select egress spec based on up1
action add_mTag(up1, up2, down1, down2) {
    add_header(mtag);
    // Copy VLAN ethertype to mTag
    modify_field(mtag.ethertype, vlan.ethertype);

// Set VLAN's ethertype to signal mTag
    modify_field(vlan.ethertype, 0xaaaa);

// Add the tag source routing information
    modify_field(mtag.up1, up1);
    modify_field(mtag.up2, up2);
    modify_field(mtag.down1, down1);
    modify_field(mtag.down2, down2);

// Set the destination egress port as well from the tag info
    modify_field(standard_metadata.egress_spec, up1);
}
```

FIG.13

```
//Declare to use primitive action, named Indirect Action.
primitive_action Indirect_Action();

...

//  Define action use indirect_action()
action apply_indirect_action (pkt) {
  metadata.indirect_action_buffer_id = buffer1
  metadata.indireict_action_target = metadata.egress_spec
}
```

FIG.14

METHOD AND APPARATUS FOR UPDATING PACKET PROCESSING RULE AT HIGH SPEED IN SDN NETWORK ENVIRONMENT

CROSS-REFERENCE TO RELATED APPLICATION(S)

This application is based on and claims priority under 35 U.S.C. § 119(a) of a Korean patent application number 10-2023-0001200, filed on Jan. 4, 2023, in the Korean Intellectual Property Office, the disclosure of which is incorporated by reference herein in its entirety.

BACKGROUND

1. Field

The disclosure relates to a wireless communication system and a transport network supporting the same. More particularly, the disclosure relates to a method and a device for supporting high-speed/low-latency packet processing.

2. Description of Related Art

Considering development through wireless communication generations, technologies such as voice call, multimedia, and data have been developed mainly for human centered services. It is expected that connected devices exponentially growing after 5th generation (5G) communication system commercialization will be connected to a communication network. Examples of things connected to the network may include a vehicle, a robot, a drone, a home appliance, a display, a smart sensor installed in various infrastructures, construction machine, factory equipment and so on. A mobile device is expected to evolve into various form factors such as augmented reality glasses, a virtual reality headset, and a hologram device. To provide various services by connecting hundreds of billions of devices and things in a 6th generation (6G) era, efforts are exerted to develop an improved 6G communication system. For this reason, the 6G communication system is referred to as a beyond 5G system.

In the 6G communication system which is expected to be realized around 2030, a peak data rate is tera (i.e., 1,000 giga) bits per second (bps), and radio latency is 100 usec. That is, compared to the 5G communication system, the data rate of the 6G communication system is 50 times faster and the radio latency is reduced to 1/10.

To achieve such high data rate and ultra low latency, the 6G communication system is considering implementation in a terahertz (THz) band (e.g., 95 GHz through 3 THz bands). It is expected that technologies for securing a signal transmission distance, that is, coverage grow in importance due to worse path loss and atmospheric absorption in the terahertz bands than millimeter waves (mmWave) band adopted into the 5G. As major technologies for securing the coverage, it is required to develop a radio frequency (RF) element, an antenna, a novel waveform having better coverage than orthogonal frequency division multiplexing (OFDM), beamforming and a multiantenna transmission technology such as massive multiple-input and multiple-output (MIMO), full dimensional (FD)-MIMO, an array antenna, multi-antenna transmission techniques such as large scale antennas and so on. Besides, new technologies for improving the terahertz band signal coverage, such as metamaterial based lens and antenna, high dimensional spatial multiplexing using orbital angular momentum (OAM), and reconfigurable intelligent surface (RIS) are under discussion.

For spectral efficiency improvement and system network enhancement, the 6G communication system is developing a full duplex technology for allowing an uplink and a downlink to simultaneously utilize the same frequency resource at the same time, a network technology for utilizing a satellite and high-altitude platform stations (HAPS) in an integrated manner, a network structure innovative technology for supporting a mobile base station and enabling network operation optimization and automation, a dynamic spectrum sharing technology through collision avoidance based on spectrum usage prediction, an artificial intelligence (AI) based communication technology for achieving system optimization by utilizing AI from a designing phase and internalizing an end-to-end AI support function, a next-generation distributed computing technology for realizing a service of complexity overcoming terminal computation capability by utilizing super high performance communication and computing resources (mobile edge computing (MEC), clouds, etc.) and so on. Besides, attempts continue to strengthen connectivity between devices, to optimize the network, to promote network entity softwarization, and to increase wireless communication openness through designing a new protocol to be used in the 6G communication system, developing mechanisms for implementing a hardware based security environment and safe data use, and developing a technology for maintaining privacy.

It is expected that the research and the development of the 6G communication system allow next hyper-connected experience through hyper-connectivity of the 6G communication system, embracing person to machine connection as well as machine to machine connection. Particularly, it is expected that services such as truly immersive extended reality (XR), high-fidelity mobile hologram, and digital replica may be provided through the 6G communication system. In addition, services such as remote surgery through security and reliability enhancement, industrial automation and emergency response may be provided through the 6G communication system, to be applied in various fields, such as industry, medical care, automobile, and home appliances.

A device constituting a network may configure a method for processing a packet via a control rule. By disclosing such a method for updating a rule at high speed, a demand for a method for updating a packet processing rule at high speed not only in an existing Internet protocol (IP)-based network but also in a special network environment of transferring a radio signal is increasing day by day. According to the disclosure, a packet processing rule may be updated at high speed so as to be applied in a special network, such as front-haul slicing. In the future, in order to support a high data transmission rate and low latency required by 6G, research on a network device and a software structure and interworking method may be necessary.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device for applying a packet processing rule at high speed in a mobile communication system.

Another aspect of the disclosure is to provide a method and a device for using a switch or a router as a part of a transport network in configuration of a mobile communication network.

Additional aspects will be set forth in part in the description which follows and, in part, will be apparent from the description, or may be learned by practice of the presented embodiments.

In accordance with an aspect of the disclosure, a method performed by a first network entity in a wireless communication system is provided. The method includes receiving, from a second network entity, a first message including information on at least one of a type, a size, or an identifier of an action buffer, which is for creating of the action buffer, receiving, from the second network entity, a second message including the identifier for adding of at least one action to multiple memories assigned to the action buffer created based on the first message, and performing an arbitrary action for an input packet based on an address of memory in which the arbitrary action among the at least one action is stored.

In accordance with another aspect of the disclosure, a method performed by a second network entity in a wireless communication system is provided. The method includes transmitting, to a first network entity, a first message including information on at least one of a type, a size, or an identifier of an action buffer, which is for creating of the action buffer, and transmitting, to the first network entity, a second message including the identifier for adding of at least one action to multiple memories assigned to the action buffer created based on the first message, wherein, an arbitrary action for an input packet is performed based on an address of memory in which the arbitrary action among the at least one action is stored.

In accordance with another aspect of the disclosure, a first network entity in a wireless communication system is provided. The first network entity includes a transceiver, memory, and one or more processors coupled to the transceiver and the memory, wherein the memory stores one or more computer programs including computer-executable instructions that, when executed by the one or more processors, cause the first network entity to receive, from a second network entity, a first message including information on at least one of a type, a size, or an identifier of an action buffer, which is for creating of the action buffer, receive, from the second network entity, a second message including the identifier for adding of at least one action to multiple memories assigned to the action buffer created based on the first message, and perform an arbitrary action for an input packet based on an address of memory in which the arbitrary action among the at least one action is stored.

In accordance with another aspect of the disclosure, second network entity in a wireless communication system is provided. The second network entity includes a transceiver, memory, and one or more processors coupled to the transceiver and the memory, wherein the memory stores one or more computer programs including computer-executable instructions that, when executed by the one or more processors, cause the second network entity to transmit, to a first network entity, a first message including information on at least one of a type, a size, or an identifier of an action buffer, which is for creating of the action buffer, and transmit, to the first network entity, a second message including the identifier for adding of at least one action to multiple memories assigned to the action buffer created based on the first message, wherein, an arbitrary action for an input packet is performed based on an address of memory in which the arbitrary action among the at least one action is stored.

In accordance with another aspect of the disclosure, one or more non-transitory computer-readable storage media storing computer-executable instructions that, when executed by one or more processors of a first network entity, cause the first network entity to perform operations are provided. The operations include receiving, from a second network entity, a first message including information on at least one of a type, a size, or an identifier of an action buffer, which is for creating of the action buffer, receiving, from the second network entity, a second message including the identifier for adding of at least one action to multiple memories assigned to the action buffer created based on the first message, and performing an arbitrary action for an input packet based on an address of memory in which the arbitrary action among the at least one action is stored.

A device and a method capable of efficiently providing a service in a wireless communication system are provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a sequence of a method of creating and managing an action buffer according to an embodiment of the disclosure;

FIG. 13 illustrates an embodiment of P4 language programming for an action according to an embodiment of the disclosure; and FIG. 14 illustrates an embodiment of P4 language programming for an action according to an embodiment of the disclosure.

Throughout the drawings, it should be noted that like reference numbers are used to depict the same or similar elements, features, and structures.

DETAILED DESCRIPTION

Figure 1:
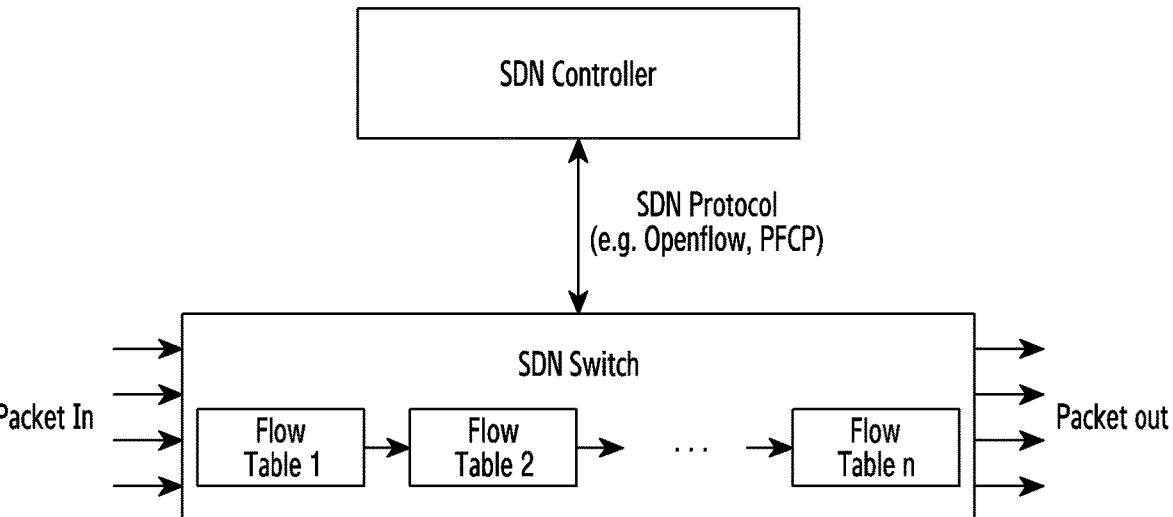
FIG. 1 illustrates a network structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to by the inventor to enable a clear and consistent understanding of the disclosure. Accordingly, is should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to device elements (e.g., control unit, processor, artificial intelligence (AI) model, encoder, decoder, autoencoder (AE), and neural network (NN) model) and terms referring to data (e.g., signal, feedback, report, reporting, information, parameter, value, bit, and codeword) are illustratively used for the sake of descriptive convenience. Therefore, the disclosure is not limited by the terms as used below, and other terms having equivalent technical meanings may be used.

Hereinafter, embodiments of the disclosure will be described with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors and/or devices.

The following description of embodiments of the disclosure is mainly directed to New Radio (NR) as a radio access network and Packet Core 5G system or 5G Core Network or Next Generation Core (NG Core) as a core network in the 5G mobile communication standards specified by the 3rd generation partnership project (3GPP) that is a mobile communication standardization group, but based on determinations by those skilled in the art, the main idea of the disclosure may be applied to other communication systems having similar backgrounds through some modifications without significantly departing from the scope of the disclosure. In addition, the main idea of the disclosure may also be applied to a post-5G mobile communication system or 6G mobile communication system that will appear after 10 years ahead.

In the following description, some of terms and names defined in the 3GPP standards (standards for 5G, NR, LTE, or similar systems) may be used for the sake of descriptive convenience. However, the disclosure is not limited by these terms and names, and may be applied in the same way to systems that conform other standards.

Furthermore, in the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

The disclosure relates to a method for supporting the operation of an unmanned aerial vehicle in a mobile communication system that complies with 3GPP standards, and an objective of the disclosure may be achieved by interacting with devices or objects to be described later.

A (radio) access network ((R)AN) refers to a technology used for wireless communication between a base station and a terminal, such as 5G-NR, E-UTRAN, and UTRAN, GERAN, and for wireless communication, a terminal may receive a communication service by connecting to an eNB or gNB which is a base station that supports a mobile communication wireless technology. A base station may interact with a core network to transmit, to a device located in the core network, data or control signals transmitted from terminals and receive configurations, transmit or receive data, or perform management procedures. In addition, the terminals may be connected to a data network by using a non-3GPP wireless access technology, such as Wi-Fi and Bluetooth, or a technology using a side link, such as a proximity service (Prose) for performing direct terminal-to-terminal communication without being connected to the base station.

Descriptions of entities constituting the core network appearing in the disclosure may be provided as follows. A unit for performing each function provided by a 5G network system may be defined as a new function (NF). A structure of a 5G mobile communication network is illustrated in FIG. 1. Representative NFs include an access and mobility management function (AMF) which manages network access and mobility of a user equipment (UE), a session management function (SMF) which performs a session-related function, a user plane function (UPF) which is responsible for transferring user data, an application function (AF) which communicates with 5GC for provision, a network exposure function (NEF) which supports communication between 5GC and an AF, a unified data management (UDM) and a unified data repository (UDR) which are for data management and storage, a policy and control function (PCF) which manages a policy, and a data network (DN), such as the Internet via which user data is transferred. In addition to the NF, there may be an operation, administration, and management (OAM) which is a system for managing a terminal and a 5G mobile communication network.

In addition, although not elements of the 5G network system, an edge computing infrastructure, an infrastructure administrator, and a service may be included as external entities for service provision. The edge computing infrastructure administrator is an entity which serves to manage resources existing in the edge computing infrastructure, and may refer to an entity which exists as an independent entity or exists on a specific service or platform to perform the same function. In the disclosure, the edge computing infrastructure administrator may assume a situation in which information may be exchanged with the 5G core network via the NEF, and may be the same as the AF or connected to the AF to enable information exchange with the core network.

The procedures, interfaces, and protocols defined in the 3GPP standard specification document may be used for information exchange and control signal exchange between the aforementioned entities. However, all terms included in the disclosure are not limited to the terms and names in 3GPP, and may be equally applied to systems and devices which comply with other standards. Embodiments of the disclosure will be described mainly with respect to communication standards defined by the 3GPP. However, the main subject of the disclosure is applicable to other communication systems having a similar technical background by making slight modifications without significantly departing from the scope of the disclosure, and this may be determined by those skilled in the art of the disclosure.

In addition to the aforementioned elements of the 5G mobile communication network, SDN network or programmable network devices may exist. Representative examples of the products may include SmartNIC which is an extension of a network interface card (NIC), FGPA which is programmable hardware, a programmable switch ASIC for a programmable switch or router, and the like. In this case, a method of causing such programmable network devices to perform some of functions performed by the network functions (NFs) defined the existing 3GPP may be referred to as off-loading. Via this, network devices which simply process tasks, such as forwarding network traffic, may assist application processing, thereby achieving benefits, such as reducing latency, increasing a transmission volume, and reducing power consumption for a service using the network. A representative type of an application which may be utilized via in-network computing may support some functions of AI/ML-related servers, a DNS server, an NAT server, a load balancer, and cache.

The disclosure relates to a wireless communication system and a transport network supporting the same and, specifically, to a method for supporting high-speed/low-latency packet processing in a future wireless mobile communication system to be disclosed later, including 5G mobile communication. A device constituting a network may configure a method for processing a packet via a control rule. By disclosing such a method for updating a rule at high speed, the disclosure may include a method for updating a packet processing rule at high speed not only in an existing IP-based network but also in a special network environment of transferring a radio signal. Via this, a packet processing rule is updated at high speed and is thus applicable in a special network, such as front-haul slicing. In the future, in order to support a high data transmission rate and low latency required by 6G, research on a network device and a software structure and interworking method is necessary.

Today, the number of terminals using a mobile communication network and the number of services and applications for supporting the terminals increase exponentially. Furthermore, in order to improve the quality of a mobile communication network, the design and application of a wireless network and a core network are becoming increasingly sophisticated. In such a situation, not only terminals simply using a voice call and a data service, but terminals having new forms, such as a factory, an unmanned aerial vehicle, a robot, a vehicle, and an aircraft, are emerging. A continuous increase in such terminals having a new form is expected, and continuous evolution of services over a mobile communication network may also be expected to effectively support objectives of the terminals.

Purposes and forms of various terminals are changing, whereas all terminals currently share radio resources in a mobile communication network, and in general, the core network is also operated in a form where terminals share the core network. Since respective terminals have different forms and purposes, there are differences in interaction with a network depending on operation forms and services used. Therefore, in order to effectively support respective types of terminals, the mobile communication network may need to maintain optimized configurations by analyzing purposes and service requirements of the respective terminals. Furthermore, in order to effectively support respective terminals and services, characteristics of respective terminals may be identified, and configuration and management may need to be optimized and automated, thereby configuring other terminals and services not to be affected.

A key function of an embodiment according to the disclosure relates to a method of updating a rule for transferring network traffic occurring in a terminal. A 5G mobile communication network designed based on software defined networking (SDN) or control and user plane separation (CUPS) may be designed so that a control plane and a data plane are distinguished. The control plane may configure a rule for processing a network packet transferred at the data plane, and via this, functions, such as destination forwarding, QoS guarantee, and usage tracking, may be defined. In this case, a change in the rule for processing the packet may occur. An embodiment according to the disclosure relates to a device and a method supporting a change in a packet processing rule at high speed. According to an embodiment of the disclosure, a traffic control may be possible in a section requiring a rule change at a high frequency, such as a wireless section of a mobile communication network. In addition, a network slicing concept may be expanded to a RAN section and introduced.

By using network slicing, which is a method of virtualizing and providing the same physical network-related resources and equipment in a network, multiple logically configured virtual networks may be used. Accordingly, a network configuration may be independently performed for each user or service. Therefore, independent network operation, such as installation of an additional necessary function, may be possible while maintaining a network configuration optimized for a service. However, according to constraints on a resource division method and a virtual network configuration method required essentially for implementation of a network slicing technology, it may be typical that, currently for most technologies design, network slicing is designed only in a core network section. It may be necessary to expand such a slicing concept and apply the same even in a base station transmission network and a wireless section. An embodiment according to the disclosure can enhance a user's service experience through wireless mobile communication via effects, such as reducing a delay time of packets occurring in a specific section in an SDN network environment and using a higher bandwidth by increasing network resource use. Furthermore, by independently processing traffic occurring on the network, costs incurred in configuring and operating network devices can be reduced.

FIG. 1 illustrates a network structure according to an embodiment of the disclosure.

Referring to FIG. 1, in a software defined network (SDN) environment, an SDN controller may be a function located on a control plane, and an SDN switch or router may be located on a data plane. The SDN controller may command a processing method for packets ingress or input to the SDN switch. In a procedure in which the SDN controller commands the processing method for the packets ingress to the SDN switch, protocols for communication between the SDN controller and the SDN switch may include OpenFlow, P4 Runtime, or the like. The SDN controller may transmit, to the switch, a flow entry which is a rule for processing specific packets. A set of flow entries may be referred to as a flow table. The SDN switch may determine a matching flow table among n different flow tables with respect to an input packet and perform instructions included in the flow table.

In the 5G mobile communication system, the SDN controller may correspond to an SMF, and the SDN switch may correspond to an UPF. In addition, a packet forwarding control protocol (PFCP) may be used for communication between the SMF and the UPF. However, content of the SDN controller is not limited to these examples, and the SDN controller may correspond to various network entities or network functions (NFs) constituting the 5G core network.

Specifically, in the SDN environment, types of messages or ways to express the method of processing a packet according to a protocol used in a device between the SDN controller and the SDN switch may vary. The protocol may essentially include instructions (or actions) for defining the method of processing a matching packet, and expressions of a matching condition enabling specification of packets. In this case, instructions and actions may be used interchangeably. In addition, the protocol may further include an indicator which may define priority of each rule, a time during which a transferred rule is valid, and the number or size of packets processed by the rule. For example, in an OpenFlow protocol, the SDN controller may transmit a flow entry, which is a rule for processing specific packets, to the switch by using a message, such as Flow_mod. In this case, a set of flow entries may be referred to as a flow table. The flow entry may include instructions and a match field which may specify packets. Packets corresponding to the match field may be processed according to the instructions. In addition, the packets processed according to the instructions may be forwarded to the SDN switch. In this case, when there are multiple flow entries that satisfy the same condition, processing may be performed according to priority. Furthermore, a flow table may continuously and repeatedly designate a packet output to a different table in a pipeline form, so that multiple flow tables may be connected. Accordingly, complicated packet processing operations may be performed by multiple flow entries rather than a single flow entry.

In addition, the OpenFlow protocol may provide a group table function of grouping and processing actions of the flow table and a meter table function for monitoring a traffic state. In an embodiment according to the disclosure, a communication method and operations of an SDN controller and a device are described based on the OpenFlow protocol. However, other SDN protocols which are P4 Runtime and PFCP may also define a data structure with a similar structure, and may have a structure enabling the controller to control the device located on a data plane.

In the 5G mobile communication system, a UPF may serve to detect a specific service and apply a quality of service (QOS)-related rule. Except for a special case, most service traffic may be transferred via the UPF, and a specific QoS-related policy may be applied. A basic application unit of a policy or rule may be a QoS flow. In the UPF, a QoS flow may be detected via a packet detection rule (PDR). In the 5G mobile communication core network, an SMF corresponding to a controller of the UPF may communicate with the UPF by using a packet forwarding control protocol (PFCP). The PFCP protocol may also perform operations corresponding to an action and match of OpenFlow via a packet detection rule (PDR) and a forwarding action rule (FAR).

Figure 2:
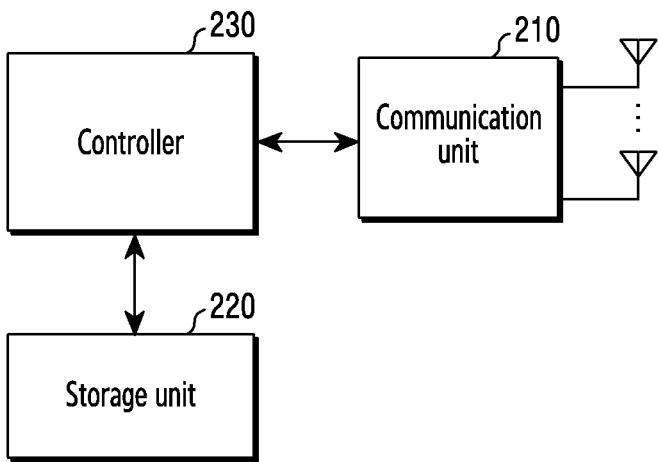
FIG. 2 illustrates a configuration of a network entity according to an embodiment of the disclosure.

FIG. 2 illustrates a configuration of a network entity according to an embodiment of the disclosure.

Referring to FIG. 2, the configuration may be understood as the SDN controller of FIG. 1 or various NFs (e.g., SMF). The terms "-unit", "-device", or the like, used hereinafter may refer to a unit configured to process at least one function or operation, and may be implemented as hardware, software, or a combination of hardware and software.

Referring to FIG. 2, the SDN controller may include a communication unit 210, a storage unit 220, and a controller 230.

The communication unit 210 may perform functions for transmitting or receiving a signal in a wired communication environment. The communication unit 210 may include a wired interface for controlling a direct device-to-device connection via a transmission medium (e.g., copper wire and optical fiber). For example, the communication unit 210 may transfer an electrical signal to another device via a copper wire, or may perform conversion between an electrical signal and an optical signal. The communication unit 210 may transmit or receive signals between network entities forming a core network according to wired communication interface standards.

The communication unit 210 may perform functions to transmit or receive a signal via a wireless channel. For example, the communication unit 210 may perform conversion between a baseband signal and a bitstream according to a physical layer specification of a system. For example, when transmitting data, the communication unit 210 may generate complex symbols by encoding and modulating a transmission bitstream. In addition, when receiving data, the communication unit 210 may restore a received bitstream by demodulating and decoding a baseband signal. In addition, the communication unit 210 may up-convert a baseband signal to a radio frequency (RF) band signal, transmit the up-converted RF band signal via an antenna, and then down-convert the RF band signal received via the antenna to a baseband signal. To this end, the communication unit 210 may include a transmission filter, a reception filter, an amplifier, a mixer, an oscillator, a digital-to-analog converter (DAC), an analog-to-digital converter (ADC), and the like.

The communication unit 210 may transmit and receive a signal as described above. Accordingly, all or a part of the communication unit 210 may be referred to as "transmitter", "receiver", or "transceiver". In addition, in the following description, transmission and reception performed via a wireless channel are used in a sense including that the communication unit 210 performs processing as described above.

The storage unit 220 may store data, such as a basic program, an application program, and configuration information, for operation of a network entity. The storage unit 220 may include volatile memory, non-volatile memory, or a combination of volatile memory and non-volatile memory. The storage unit 220 may provide stored data in response to a request of the controller 230.

The controller 230 may control overall operations of the SDN controller. For example, the controller 230 may transmit and receive a signal via the communication unit 210. In addition, the controller 230 may record and read data in the storage unit 220. The controller 230 may perform functions of a protocol stack required by the communication standards. According to another implementation, the protocol stack may be included in the communication unit 210. To this end, the controller 230 may include at least one processor. In addition, in an SDN environment, the controller 230 may transmit a flow entry for processing specific packets to an SDN switch via the communication unit 210.

[First Embodiment]—Defining Indirect Operation Form in OpenFlow Device

OpenFlow is a method for processing a packet, and a flow entry and a flow table for managing the flow entry may be defined. A flow entry may include a match field for distinguishing specific or target packets from other packets and an instruction indicating an action to be performed for a matching packet. For example, an instruction may include detailed instructions to be applied to a packet, and may include operations related to various actions, such as immediately applying an action, removing an action, recording an action, moving a table, and using a group table. An instruction may indicate to perform multiple actions during packet processing. For example, an instruction may be a command for a function, such as adding, removing, and applying metadata and an action required to be processed for a target packet. For example, a type of an actually applied action may include adding a header, such as a virtual local area network (VLAN), provider backbone bridges (PBBs), and multiprotocol label switching (MPLS), removing a header, designating an output port (output), designating a group table, performing a QoS-related action, or the like.

All types of actions defined in OpenFlow may be transferred during flow entry configuration, and may be values that do not change while a flow entry is operating at a later time. Therefore, changing content of a flow entry may involve removing and adding a flow table entry. In some flow entries, a matching condition may be maintained, and a modification action of updating only an action may be performed. However, in actual implementation, there may be multiple methods for implementation of the modification action depending on a design of a manufacturer.

An embodiment of the disclosure may include a method and a device for adding an indirect action in addition to the aforementioned types of actions. Unlike the operation types of basic rules of OpenFlow described above, in a proposed action type, an additional action may be added after rule installation and an action having already been performed may be removed. For example, processing of packets corresponding to matching may be changed according to repairing of the packets. The aforementioned features may be very useful in processing scheduled network traffic, where a sequence of packets is already determined. In other words, a packet transfer determined according to a schedule may be possible at a specific point in time. On the other hand, in the existing method, a packet to be transferred at a specific point in time cannot be specified, so that only packet forwarding may be performed according to a probability or a group rule. However, in case of an embodiment according to the disclosure, as action to be processed may vary dynamically according to a packet input sequence, and thus traffic control at a fine level may be possible.

Figure 3:
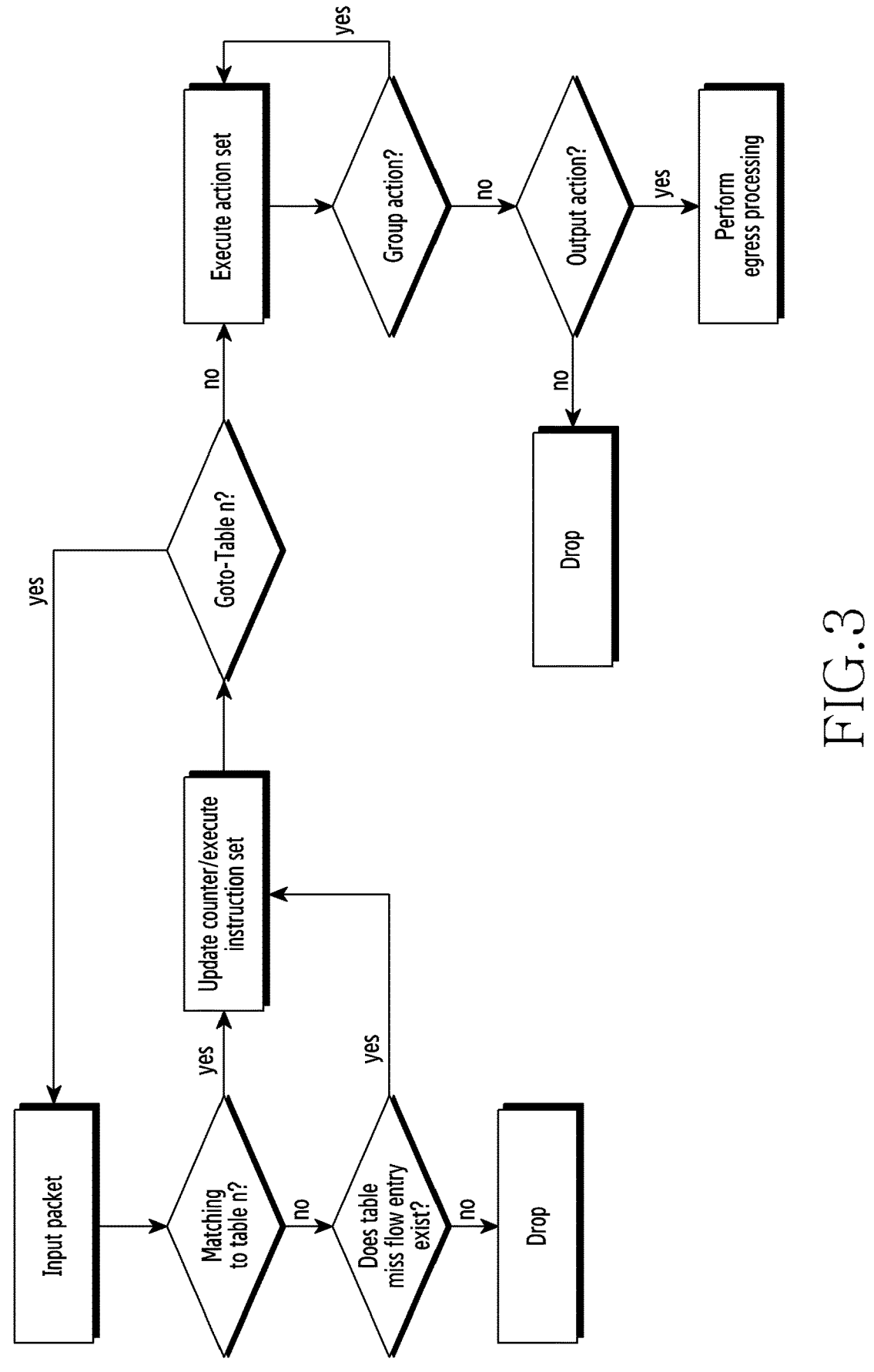
FIG. 3 illustrates a sequence of processing packets in OpenFlow according to an embodiment of the disclosure.

FIG. 3 illustrates a sequence of processing packets in OpenFlow according to an embodiment of the disclosure.

Referring to FIG. 3, an SDN device (e.g., a device including an SDN controller and an SDN switch) may process a packet according to a flow entry transferred using an SDN protocol, such as OpenFlow. When a packet arrives at the SDN device, the SDN device may extract header information of the packet. In this case, the SDN device may identify whether a matching flow entry exists, according to the extracted header information. Packet matching may be performed according to information of a flow table. When there are multiple tables (e.g., flow tables), matching may be performed starting from a table with a low-sequence ID. Here, the low-sequence ID may refer to a sequence having a low index for an identifier of a flow table. However, the disclosure is not limited to performing matching starting from a table with a low-sequence ID, and the SDN device may determine whether each table matches, according to a random sequence with respect to multiple tables. In this case, when the packet does not match the table, the SDN device may define a table-miss flow entry and perform an operation for a case where the packet does not match the table. In addition, when there is no defined Table-miss flow entry, the arrived packet may be dropped. On the other hand, when there is a matching flow entry in the table, the SDN device may update a counter and may execute instruction sets or add a defined action according to a rule of the flow entry.

Then, the SDN device may determine whether to process the packet via another table. For example, when a Goto table instruction, which indicates processing by another table, is included in instructions of the matching flow entry, the SDN device may additionally perform a match-action for the packet by referring to a table corresponding to an ID included in the instruction. In this case, a procedure to be performed may be the same as the procedure in which the packet arrives and is processed by referring to the table.

When there is no more flow table to be referenced, actions accumulated during processing may be performed. For example, the SDN device may execute actions (or action sets) accumulated during processing, according to the rule of the flow entry. In this case, specific instructions may be performed immediately, while other specific instructions may be processed all at once in a later processing operation without being performed immediately.

In addition, the SDN device may determine whether to process the packet via a group table. When determining to process the packet via the group table, the SDN device may additionally perform an instruction included in the group entry. When determining not to process the packet via the group table, the SDN device may finally perform an output action to transfer the processed packet through a port corresponding to an output. However, when the processed packet is not transferred through the output port, the processed packet may be dropped. Alternatively, when transferring the processed packet through the output port, the SDN device may perform egress or output processing. In this case, during the processed packet transfer through the output port, at least one of updating, removing, or adding the header of the packet and information included in the header may be performed according to an egress table.

Figure 4:
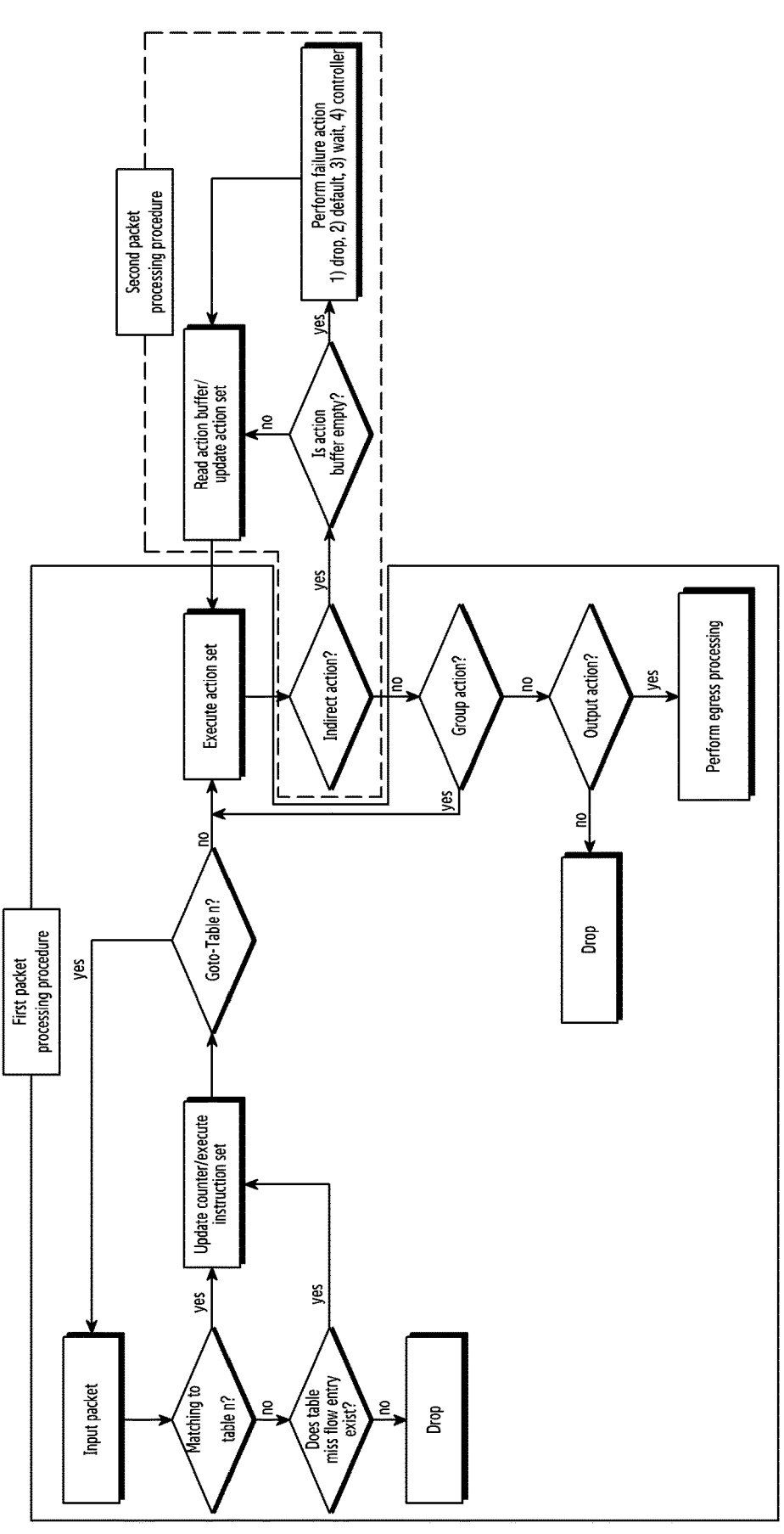
FIG. 4 illustrates a packet processing sequence using an indirect action according to an embodiment of the disclosure.

FIG. 4 illustrates a packet processing sequence using an indirect action according to an embodiment of the disclosure.

FIG. 4 may be an embodiment further including operations for processing an indirect action in the aforementioned embodiment (e.g., OpenFlow processing operation) of FIG. 3. Accordingly, descriptions overlapping with those of FIG. 3 may be omitted.

Referring to FIG. 4, an SDN device may determine to additionally perform an indirect action for a packet matching a table. In this case, packet processing via an indirect action may be referred to as second packet processing. In an embodiment according to the flowchart illustrated in FIG. 4, when the SDN device additionally performs an indirect action, the SDN device may identify whether an action buffer is empty. For example, when there is no action stored in the action buffer to be referenced, the SDN device may perform a predefined failure action. In an embodiment of the disclosure, the SDN device may predefine at least one of operations for drop, default action, wait, or requesting a controller to indicate a processing operation. In addition, when the action buffer is not empty or a failed action is performed, the SDN device may read the action buffer or update actions (or action set).

Figure 5:
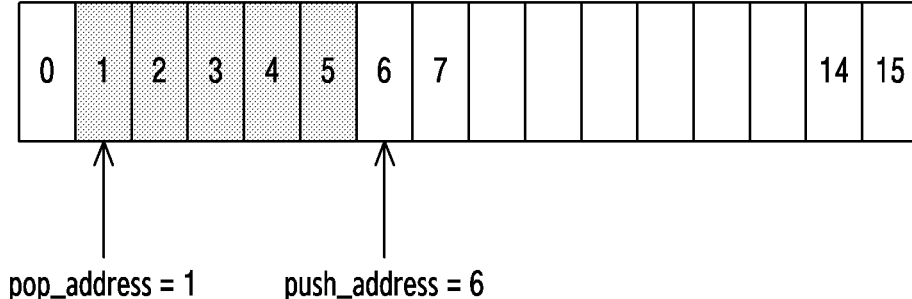
FIG. 5 illustrates a method of creating and managing an action buffer according to an embodiment of the disclosure.

FIG. 5 illustrates a method of creating and managing an action buffer according to an embodiment of the disclosure;

Referring to FIG. 5, a method of dynamically assigning an instruction or action containing a packet processing method in a series of packet processing procedures may be included. In this case, assigned instructions may be accumulated in a specific waiting space. The waiting space for the instructions may be referred to as an action buffer. Information stored in the action buffer may be the instructions or actions, and the instructions or actions may vary depending on requirements and operation methods of respective devices. For example, a method of creating and managing an action buffer may include a stack, a queue, a priority queue, or a ring buffer.

In an embodiment of the disclosure, a method of creating and managing an action buffer by using a ring buffer may be described. An action buffer may include a push operation of adding an action or an instruction to memory and a pop operation of referencing an instruction. Each operation may provide an interface enabling an item to be input and/or output according to a defined operation. In this case, the item to be input and/or output may refer to an instruction or an action.

Information for creating and managing of the action buffer may include at least one of an action buffer identifier, an action buffer size, or an action buffer type. The action buffer identifier may be used to distinguish a specific action buffer from another action buffer. The action buffer size may declare the number of containable items. The action buffer type may declare a data structure type (e.g., a ring buffer) for managing of the action buffer. In addition, the information for creating and managing of the action buffer may further include the number of pop operations (e.g., Pop_count) and the number p push operations (e.g., Push_count).

Additionally, when more items (e.g., actions or instructions) are input to each action buffer in comparison with memory space assigned according to a type, the SDN devices may provide a method of managing the input items. Accordingly, the information for creating and managing of the action buffer may further include information on an operation of a case where the action buffer is full or empty.

In an embodiment of the disclosure, when the memory space is full, the SDN device may ignore an additional push or insert request. Alternatively, the SDN device may receive an input of a recently pushed item, and remove an action with a lowest priority or an oldest action (remove oldest). Alternatively, the SDN device may remove a latest item (remove latest). However, the aforementioned operation is merely an embodiment according to the disclosure, and is not limited to the example described above. Therefore, the SDN device may configure, in advance, to operate in a manner different from the aforementioned operations when the memory space is full.

In an embodiment of the disclosure, a management method when the action buffer is empty may be described. The SDN device may define four operations to perform when the action buffer is empty.

1) Drop: The SDN device may drop a packet without forwarding the packet.
2) Default action: The SDN device may declare a default action which operates when there is no buffer. The default action may be the same or similar to a table miss flow entry.
3) Wait: The SDN device may wait to process a packet until an action of the buffer is received (e.g., when an action is added to the action buffer).
4) Controller: The SDN device (e.g., an SDN switch) may request an SDN controller to indicate a packet processing method.

FIG. 6 illustrates a sequence of a method of creating and managing an action buffer according to an embodiment of the disclosure.

Referring to FIG. 6, descriptions may be provided for a simple procedure of a method for creating, managing, and using an action buffer performed by an SDN switch according to an embodiment of the disclosure.

In operation 610, an SDN switch may receive, from an SDN controller, a first message including at least one of information on an identifier, a size, or a type of an action buffer, which is for creating of the action buffer.

In operation 620, the SDN switch may create the action buffer, based on the first message received from the SDN controller. In addition, the SDN switch may receive, from the SDN controller, a second message for adding at least one action to multiple memories assigned to the created action buffer. In this case, the second message may include information on the identifier of the action buffer to which at least one action is to be added.

In operation 630, the SDN switch may, by referring to an address of memory in which an arbitrary action among at least one action added to the action buffer is stored, perform the arbitrary action stored in the memory with respect to an input packet. For example, as described above, an indirect action may refer to a method in which the SDN switch performs the action stored in the memory, in which the additional action is stored, by referring to the address of the memory.

In the procedure described above, operations 610 and 620 may be a procedure for the SDN switch to create and manage the action buffer under the control of the SDN controller, and operations 610 and 620 may be described in FIG. 7 below. Operation 630 may be a procedure in which the SDN switch processes the packet with reference to the action buffer, and operation 630 may be described il in FIG. 8 below.

Figure 7:
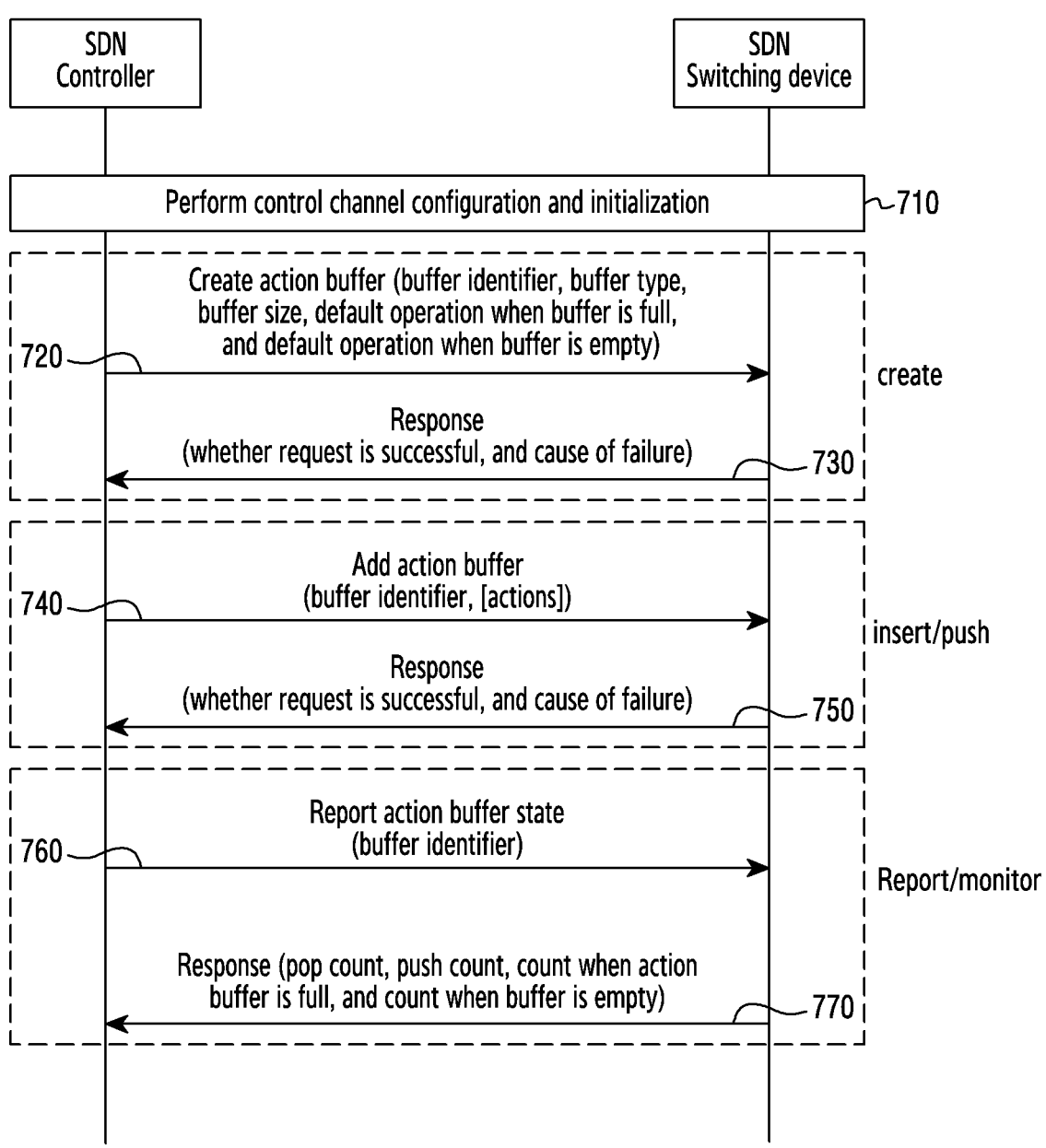
FIG. 7 illustrates a signal flow for creating and managing an action buffer in a software defined network (SDN) using OpenFlow according to an embodiment of the disclosure.

FIG. 7 illustrates a signal flow for creating and managing an action buffer in a software defined network (SDN) using OpenFlow according to an embodiment of the disclosure.

Referring to FIG. 7, a method of creating and managing an action buffer may include three procedures of creation, insertion/pushing, and reporting/monitoring, but the respective procedures do not need to be performed in the sequence illustrated in FIG. 7. In addition, one or more of the procedures illustrated in FIG. 7 (e.g., operations 710 to 770) may be omitted, and all procedures do not necessarily have to be included.

In operation 710, an SDN protocol channel for communication between an SDN controller and an SDN switch may be generated, and an assumption may be made for a situation in which configuration of a control channel and initialization related to a default operation have been completed.

In operation 720, the SDN controller may indicate the SDN switch to create an action buffer. Information transferred to indicate to create the action buffer may include at least one of a buffer identifier, a buffer type, a buffer size, a default action when the buffer is full, or a default action when the buffer is empty. The buffer identifier may be used to distinguish the identifier of the currently requested buffer from other action buffers. The buffer type (e.g., a stack, a queue, or a ring buffer) may refer to a management type for the buffer, and may include a buffer management method according to each buffer type. The buffer size may include information on a maximum number of actions that can be stored in the current action buffer. A default operation when the buffer is full and a default operation when the buffer is empty may be the same as those described in FIG. 5 above.

In operation 730, the SDN switch having received the request for creating the action buffer from the SDN controller may transmit, to the SDN controller, a response message including a result of creation of the action buffer or related initialization. The response message may include information on whether the request has been successful or a cause of a failure when the request has failed.

In operation 740, the SDN controller may transmit, to the SDN switch, a message to add an action to be performed next. In this case, the SDN switch may select a buffer, to which the action is to be added, by using the identifier of the action buffer created in operation 720.

In operation 750, the SDN switch may transmit a response message including whether the adding of the action has been successful or a cause of a failure when the adding has failed, to the SDN controller in response to the message received in operation 740. For example, if the adding of the action fails, the cause of the failure may be the buffer being full.

In operation 760, in order to monitor a state of the action buffer, the SDN controller may transmit, to the SDN switch, a message for indicating to report information related to the action buffer to be monitored. In an embodiment of the disclosure, by adding, to the message, information on the identifier of the action buffer created in operation 720, the SDN controller may select the action buffer to which the action is to be added. In an embodiment of the disclosure, by either not adding information on the identifier of the action buffer or adding identifiers of all action buffers, the SDN controller may configure the SDN switch to report states of all action buffers.

In operation 770, the SDN switch having received the message in operation 760 may transmit, to the SDN controller, a response message including information on the state of the action buffer corresponding to the identifier included in the message. The information on the state of the action buffer may include at least one of a count of a currently popped action buffer, a count of a push action, a default operation when the action buffer is full, or a default operation when the buffer is empty.

Figure 8:
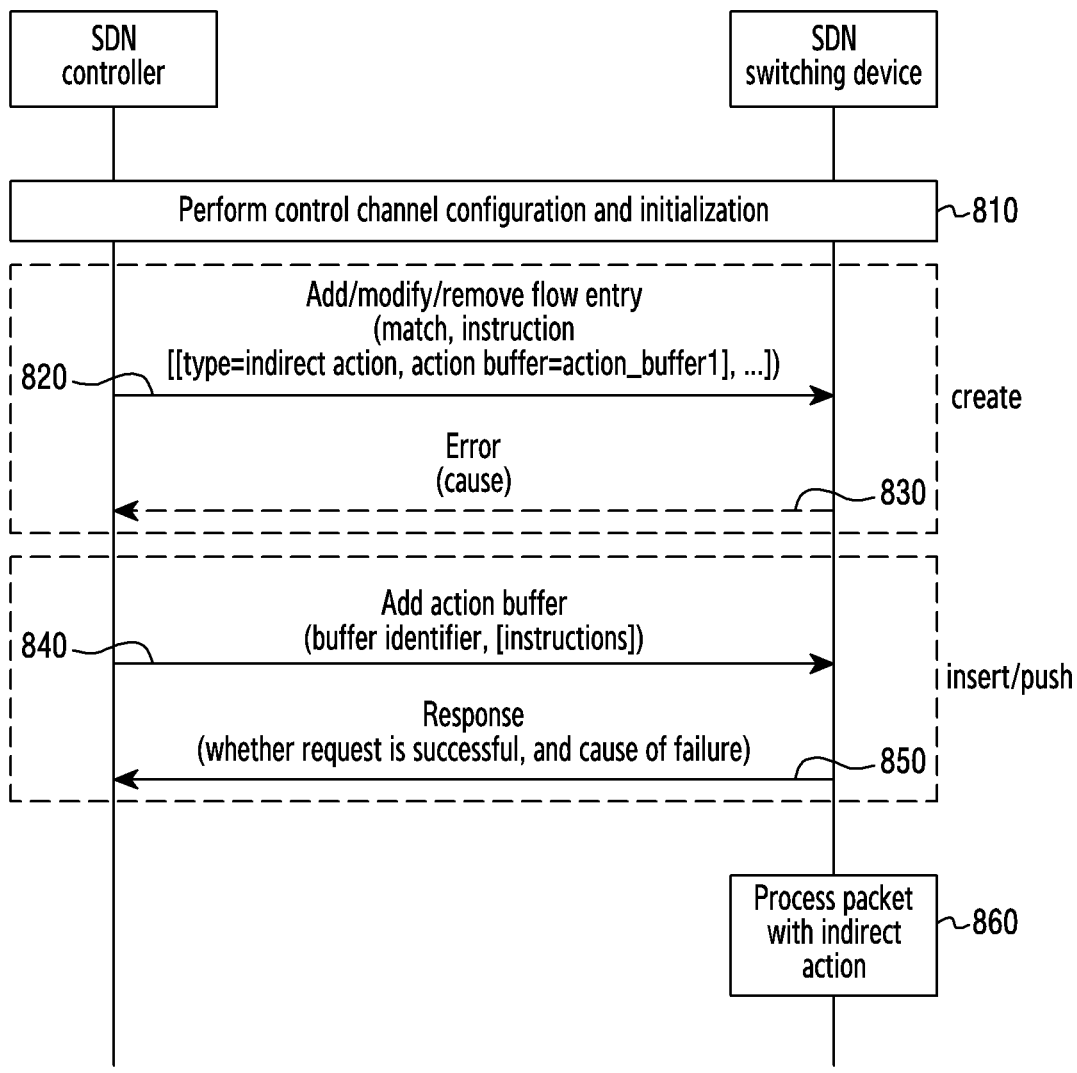
FIG. 8 illustrates a signal flow for using an action buffer in an SDN environment using OpenFlow according to an embodiment of the disclosure.

FIG. 8 illustrates a signal flow for using an action buffer in an SDN environment using OpenFlow according to an embodiment of the disclosure.

Referring to FIG. 8, a method for using an action buffer may include three procedures of creation, insertion/pushing, and packet processing, but the respective procedures do not need to be performed in the sequence illustrated in FIG. 8. In addition, among the procedures illustrated in FIG. 8, one or more procedures in operations (e.g., operations 810 to 850) before packet processing (e.g., operation 860) may be omitted, and all procedures do not necessarily have to be included.

In operation 810, an SDN protocol channel for communication between an SDN controller and an SDN switch may be generated, and an assumption may be made for a situation in which configuration of a control channel and initialization related to a default operation have been completed.

In operation 820, the SDN controller may transmit, to the SDN switch, a message for indicating to add, modify, or remove a flow entry. In this case, the message may be flow_mod (or ofp_flow_mod). The flow_mod message may be a message used to add or modify a flow entry transferred from the SDN controller to the SDN switch. The flow_mod message may include elements, such as match, instruction, priority, table identifier (table_id), cookie, and timeout which are defined in OpenFlow. The instruction included in the flow_mod message may include actions to be performed on a packet corresponding to the match. The instruction may be declared in a structure of a set and may include multiple instructions. In this case, an index may be used to refer to an instruction of a specific position. For example, instructions [0] may be used to refer to a first instruction. For the structure of the instruction, a type and a length of the instruction may be declared using an ofp_instruction_header structure, and then a structure corresponding to an actual instruction type may follow. For example, a structure including information on an actual instruction corresponding to the instruction type may include GOTO_TABLE, WRITE_METADATA, WRITE_ACTIONS, or APPLY_ACTIONS. An embodiment according to the disclosure may include INDIRECT_ACTION in addition to the structure described above. In addition, INDIRECT_AC-TION refers to an action buffer having actual information, so that the SDN switch may perform an action even during operation. In addition, the SDN controller may transfer an initial value of the action buffer to the SDN switch. An instruction to be added or an action to be actually performed may be added to the action buffer. The aforementioned action buffer may be declared in two types which are an instruction buffer and an action buffer. An instruction buffer may have instructions as entries, and an action buffer may have action structures as entries. In order to use the action buffer, it may be required to first create the action buffer before operation 820.

In operation 830, in response to the message received in operation 820, the SDN switch may, when an error occurs during adding, modifying, or removing of the flow entry, transmit information including a cause of the error to the SDN controller.

In operation 840, the SDN controller may transmit, to the SDN switch, a message for adding, to the action buffer, an instruction or action to be executed. In this case, by using an identifier of the action buffer, which is added via the instruction in operation 820, the SDN switch may add an instruction or action to the action buffer corresponding to the identifier.

In operation 850, the SDN switch may report whether adding the entry to the action buffer has been successful. When an error occurs during the adding to the action buffer, the SDN switch may transmit information including a cause of the error to the SDN controller.

In operation 860, when the flow entry added in operation 820 matches with respect to an input packet, the SDN switch may perform packet processing by referring to the action buffer. Performing of the packet processing by referring to the action buffer may refer to an operation according to the aforementioned second packet processing in FIG. 4.

[Second Embodiment]—Embodiment of Indirect
Operation Type in Packet Forwarding Control
Protocol (PFCP) Device Descriptions may be provided for a method of applying the aforementioned embodiment according to the disclosure to a packet-gateway (P-GW) of LTE or a UPF which is a packet processing device of the core network used for mobile communication defined by 3GPP. 5G mobile communication may process user data and transfer the processed user data to a data network (DN). Therefore, in the following embodiments of the disclosure, description of operation of a UPF may be the same as description of operation of a P-GW.

A UPF may process a packet transmitted from an SMF, and a PFCP may be used for communication between the UPF and the SMF. The PFCP may function similarly to the aforementioned OpenFlow, and the SMF serving as an SDN controller may be used to transmit and/or receive a command or a report to/from the UPF serving as an SDN switch so as to control packets. The PFCP may have a different message structure from OpenFlow, and may include at least one of a packet detection rule (PDR) for specifying a packet to be processed, or a forwarding action rule (FAR) for forwarding a packet corresponding to the PDR. In addition, the PFCP may include at least one of a usage report rule (URR) for reporting state and information of the UPF, a buffering action rule (BAR) for defining a buffering-related operation, or a QoS enforcement rule (QER) for applying QoS. For example, the PDR may correspond to the match in OpenFlow, and rules including actions corresponding to the PDR may be one of the FAR, URR, or QER.

In an embodiment according to the disclosure, an indirect action rule (IAR) may be defined to perform a packet processing rule including an indirect action, and a method of using the IAR may be described. The IAR may include an identifier of an action buffer for performing an indirect action, and information on an action that should actually be performed. In this case, actions included in the IAR may be previously applied rules, such as the FAR, URR, or QER. In the disclosure, these operations may be referred to as actions, and detailed action types may include previously applied rules, such as the FAR, URR, or QER. For example, the IAR may include an identifier of an action buffer, and an actual packet may be matched via the PDR. The UPF may refer to an actual action buffer during IAR performance. For example, the action buffer may include the FAR, URR, or QER, and the UPF may be used for packet processing by referring to the FAR, URR, or QER.

Figure 9:
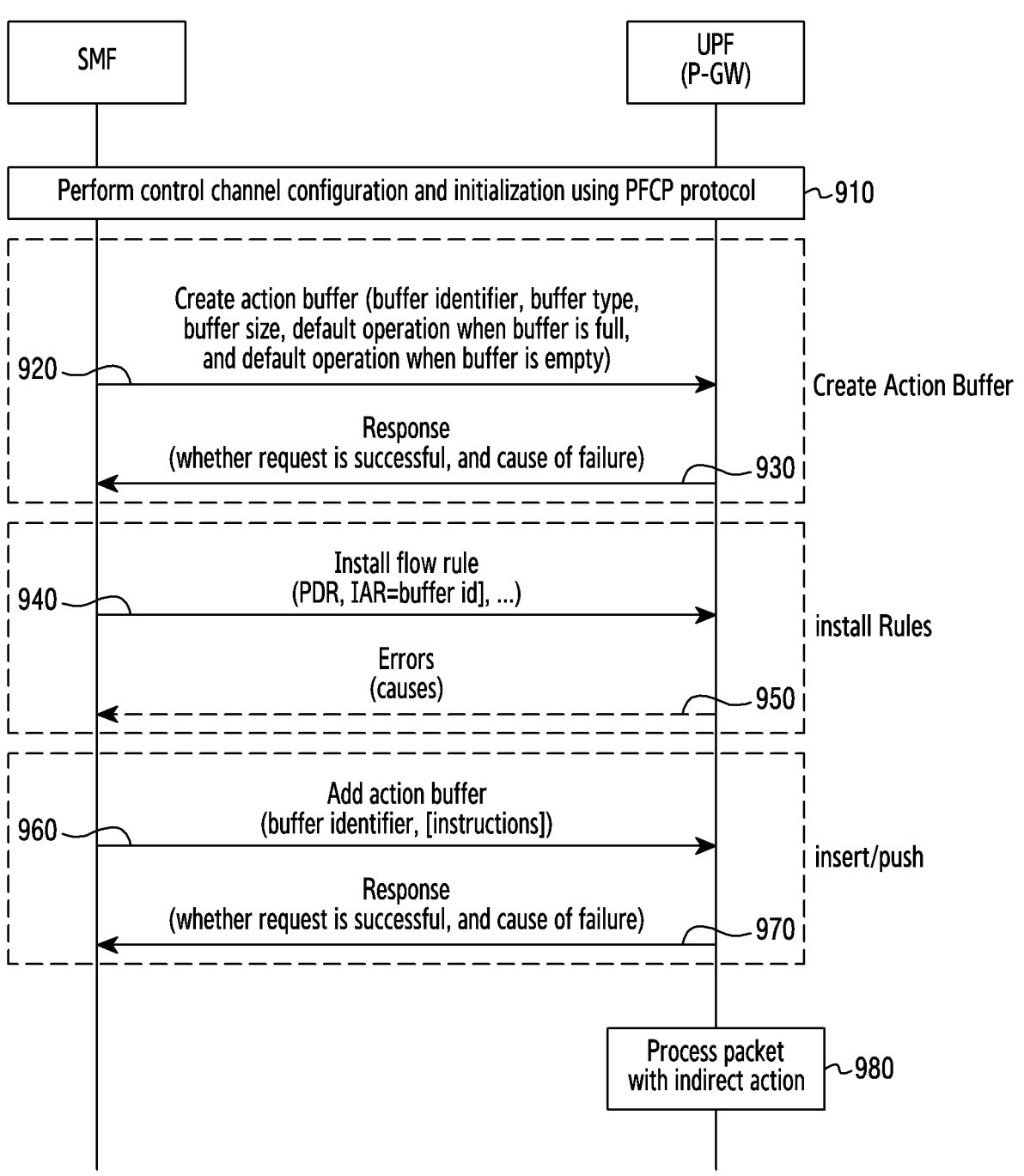
FIG. 9 illustrates a signal flow for using an action buffer in an environment using an indirect action rule (IAR) according to an embodiment of the disclosure.

FIG. 9 illustrates a signal flow for using an action buffer in an environment using an indirect action rule (IAR) according to an embodiment of the disclosure.

Referring to FIG. 9, a method of creating and using an action buffer may include three procedures of creating an action buffer, installing rules, and insertion/pushing, but the respective procedures do not need to be performed in the sequence illustrated in FIG. 9. In addition, one or more of the procedures illustrated in FIG. 9 (e.g., operations 910 to 970) may be omitted, and all procedures do not necessarily have to be included.

In operation 910, a UPF and an SMF may perform initialization using a PFCP protocol, and establish a connection to enable communication and configuration.

In operation 920, the SMF may indicate the UPF to create an action buffer. Information transferred to indicate to create an action buffer may include at least one of a buffer identifier, a buffer type, a buffer size, a default action when the buffer is full, or a default action when the buffer is empty. The buffer identifier may be used to distinguish the identifier of the currently requested buffer from other action buffers. The buffer type (e.g., a stack, a queue, or a ring buffer) may refer to a management type for the buffer, and may include a buffer management method according to each buffer type. The buffer size may include information on a maximum number of actions that can be stored in the current action buffer. A default operation when the buffer is full and a default operation when the buffer is empty may be the same as those described in FIG. 5 above.

In operation 930, the UPF having received the request for creating the action buffer from the SMF may transmit, to the SMF, a response message including a result of creation of the action buffer or related initialization. The response message may include information on whether the request has been successful or a cause of a failure when the request has failed.

In operation 940, the SMF may install, remove, or modify multiple rules in the UPF. Each rule may be defined to be a type, such as a PDR, a QER, or an FAR. In addition, via a combination of the PDR and other rules, actions required to be processed for a specific packet may be defined. In an embodiment of the disclosure, a data structure of an IAR associated with a specific PDR may be defined. In addition, the IAR may refer to an action buffer in which actual actions are stored. Actual actions processed in the IAR for one packet may be different from actions in the IAR, which are applied to a subsequent packet.

In operation 950, in response to a message received in operation 940, the UPF may, when an error occurs during installing, removing, or modifying of the rules, transmit information including a cause of the error to the SMF.

In operation 960, the SMF may transmit, to the UPF, a message to add an action to be performed next. In this case, the SMF may select a buffer, to which the action is to be added, by using the identifier of the action buffer created in operation 920.

In operation 970, the UPF may transmit a response message including whether the adding of the action has been successful or a cause of a failure when the adding has failed, to the SMF in response to the message received in operation 960. For example, if the adding of the action fails, the cause of the failure may be the buffer being full.

The aforementioned operations 960 and 970 may not occur dependently on operations 940 and 950. The aforementioned operations 960 and 970 may be performed after operations 920 and 930 are performed and before operations 940 and 950 are performed.

In operation 980, when the flow rule (e.g., the PDR) added in operation 940 matches with respect to an input packet, the UPF may perform packet processing by referring to the action buffer. Performing of the packet processing by referring to the action buffer may refer to an operation according to the aforementioned second packet processing in FIG. 4.

[Third Embodiment]—Embodiment of Using
Indirect Operation Type in PFCP Device

An embodiment according to the disclosure may include a method of expressing a rule for packet processing, as a part of a forwarding action rule (FAR). The FAR may be a rule including an instruction on how a packet needs to be processed. In the FAR, actions, such as dropping, forwarding, multicasting, or buffering a packet specified by the PDR, may be performed. In an embodiment according to the disclosure, the actions included in the FAR may include an expansion method which enables an indirect action to be performed. The indirection action may refer to a method of referencing an action buffer in which an actual action is stored, and the action buffer may be created/managed via a separate procedure before the PDR and the FAR are installed.

Figure 10:
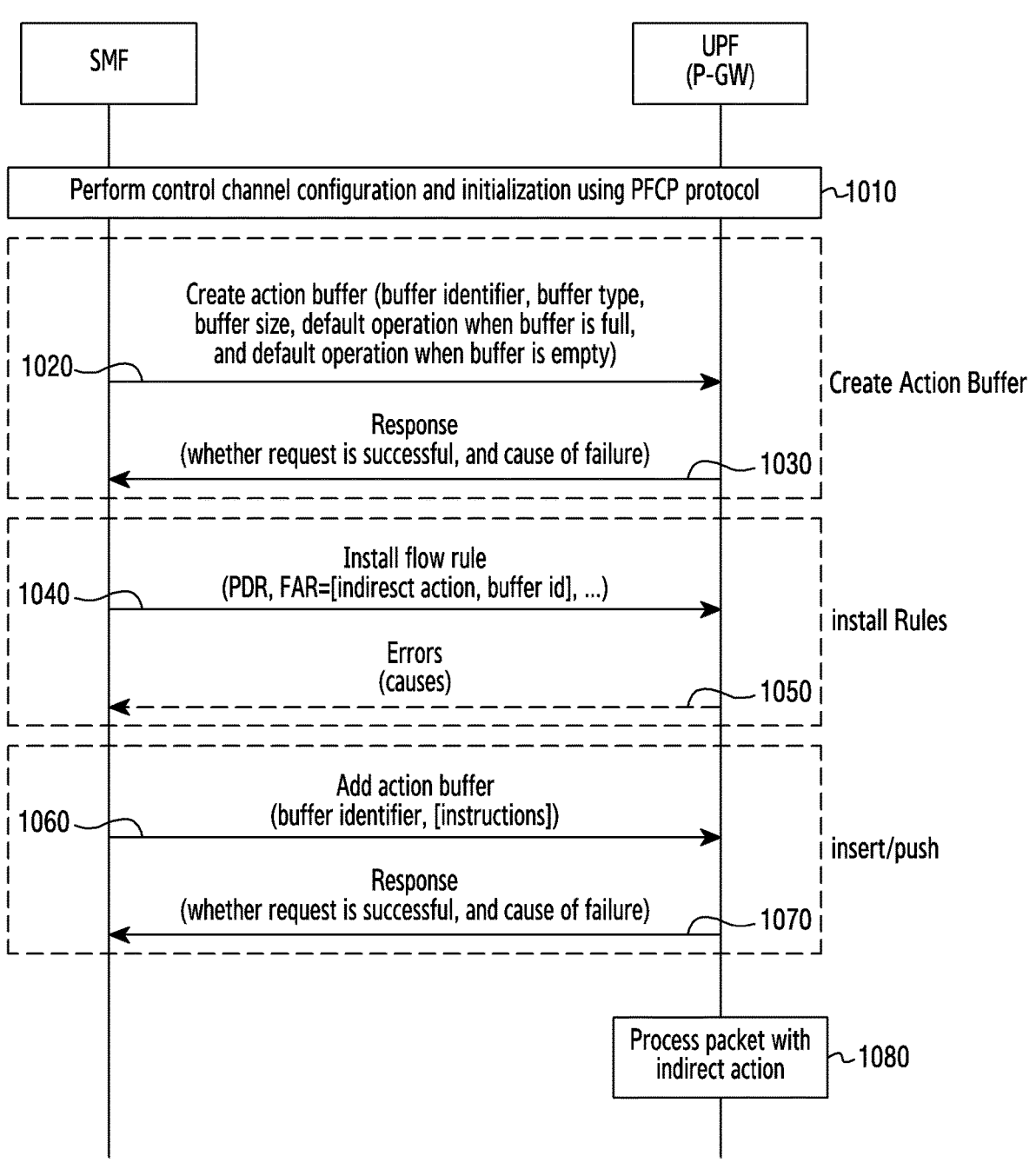
FIG. 10 illustrates a signal flow for performing an indirect action by expanding a forwarding action rule (FAR) according to an embodiment of the disclosure.

FIG. 10 illustrates a signal flow for performing an indirect action by expanding a FAR according to an embodiment of the disclosure.

Referring to FIG. 10, a method of creating and using an action buffer may include three procedures of creating an action buffer, installing rules, and insertion/pushing, but the respective procedures do not need to be performed in the sequence illustrated in FIG. 10. In addition, one or more of the procedures illustrated in FIG. 10 (e.g., operations 1010 to 1070) may be omitted, and all procedures do not necessarily have to be included.

In operation 1010, a UPF and an SMF may perform initialization using a PFCP protocol, and establish a connection to enable communication and configuration.

In operation 1020, the SMF may indicate the UPF to create an action buffer. Information transferred to indicate to create an action buffer may include at least one of a buffer identifier, a buffer type, a buffer size, a default action when the buffer is full, or a default action when the buffer is empty. The buffer identifier may be used to distinguish the identifier of the currently requested buffer from other action buffers. The buffer type (e.g., a stack, a queue, or a ring buffer) may refer to a management type for the buffer, and may include a buffer management method according to each buffer type. The buffer size may include information on a maximum number of actions that can be stored in the current action buffer. A default operation when the buffer is full and a default operation when the buffer is empty may be the same as those described in FIG. 5 above.

In operation 1030, the UPF having received the request for creating the action buffer from the SMF may transmit, to the SMF, a response message including a result of creation of the action buffer or related initialization. The response message may include information on whether the request has been successful or a cause of a failure when the request has failed.

In operation 1040, the SMF may install, remove, or modify multiple rules in the UPF. Each rule may be defined to be a type, such as a PDR, a QER, or an FAR. In addition, via a combination of the PDR and other rules, actions required to be processed for a specific packet may be defined. In an embodiment of the disclosure, an indirect action may be defined by expanding a data structure of a FAR associated with a specific PDR, and an actual action may be performed with reference to the action buffer. Unlike the aforementioned IAR, in the FAR, only operations definable in the FAR may be stored in the action buffer.

In operation 1050, in response to a message received in operation 1040, the UPF may, when an error occurs during installing, removing, or modifying of the rules, transmit information including a cause of the error to the SMF.

In operation 1060, the SMF may transmit, to the UPF, a message to add an action to be performed next. In this case, the SMF may select a buffer, to which the action is to be added, by using the identifier of the action buffer created in operation 1020.

In operation 1070, the UPF may transmit a response message including whether the adding of the action has been successful or a cause of a failure when the adding has failed, to the SMF in response to the message received in operation 1060. For example, if the adding of the action fails, the cause of the failure may be the buffer being full.

The aforementioned operations 1060 and 1070 may not occur dependently on operations 1040 and 1050. The aforementioned operations 1060 and 1070 may be performed after operations 1020 and 1030 are performed and before operations 1040 and 1050 are performed.

In operation 1080, when the flow rule (e.g., the PDR) added in operation 1040 matches with respect to an input packet, the UPF may perform packet processing by referring to the action buffer. Performing of the packet processing by referring to the action buffer may refer to an operation according to the aforementioned second packet processing in FIG. 4.

[Fourth Embodiment]—Using Indirect Operation in
Mobile Communication Front-Haul Section Network slicing or virtual networks may be provided as one of important services in 5G mobile communication or modern networks. Network slicing or virtual networks may refer to technologies which distinguish limited physical devices or resources into logical devices and resources, and enable, via isolation there between, separate network operation without interference. In network slicing, an identical physical network may be divided into multiple networks and used, and thus the network slicing may be advantageous over configuring an existing single physical network in terms of network operation independence, flexibility, and price.

In order to support virtual networks or network slicing, traffic transferred in a physical network may need to be differentiated. Such methods may be referred to as network virtualization. For example, traffic may be distinguished by additionally including a virtual network identifier, such as a virtual local area network (VLAN) or a virtual extensible local area network (VXLAN), in header information. In a typical IP-based network, a packet transmitter and a packet receiver may be clearly distinguished based on an IP address. However, because a front-haul section of wireless communication serves to transfer a wireless signal received in an antenna, it may be difficult to determine a user or slice to which a specific packet belongs to. Therefore, it may be difficult to provide network slicing in a front-haul section.

In order to provide network slicing, it may be necessary to know information on a virtual network to which a signal received in an antenna or radio head unit (RHU) is mapped. A method of indirectly identifying information on a virtual network to which a signal received in an antenna or RHU is mapped in the mobile communication network may include identifying a terminal and a time, for which using an uplink is allowed by a centralized unit (CU) during scheduling of a radio resource.

Figure 11:
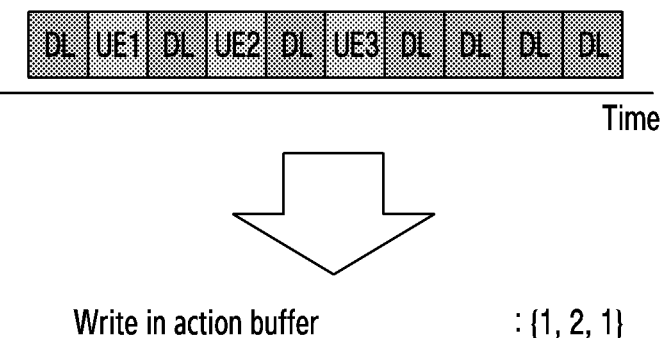
FIG. 11 illustrates radio resources allocated to one frame (10 ms) according to an embodiment of the disclosure.

FIG. 11 illustrates radio resources allocated to one frame (10 ms) according to an embodiment of the disclosure.

Referring to FIG. 11, a description may be provided for an embodiment of radio resources allocated to one frame (10 ms) section in which network scheduling is performed. For example, it may be identified that resources (e.g., uplink resources) for UE1, UE2, and UE3 are allocated to sub-frames 1, 3, and 5, respectively. For example, similar to the embodiments of the indirect action described above, the method of FIG. 11 may be a method of parameterizing one frame section in which a radio resource is scheduled, and referencing a parameter corresponding to a specific sub-frame.

Figure 12:
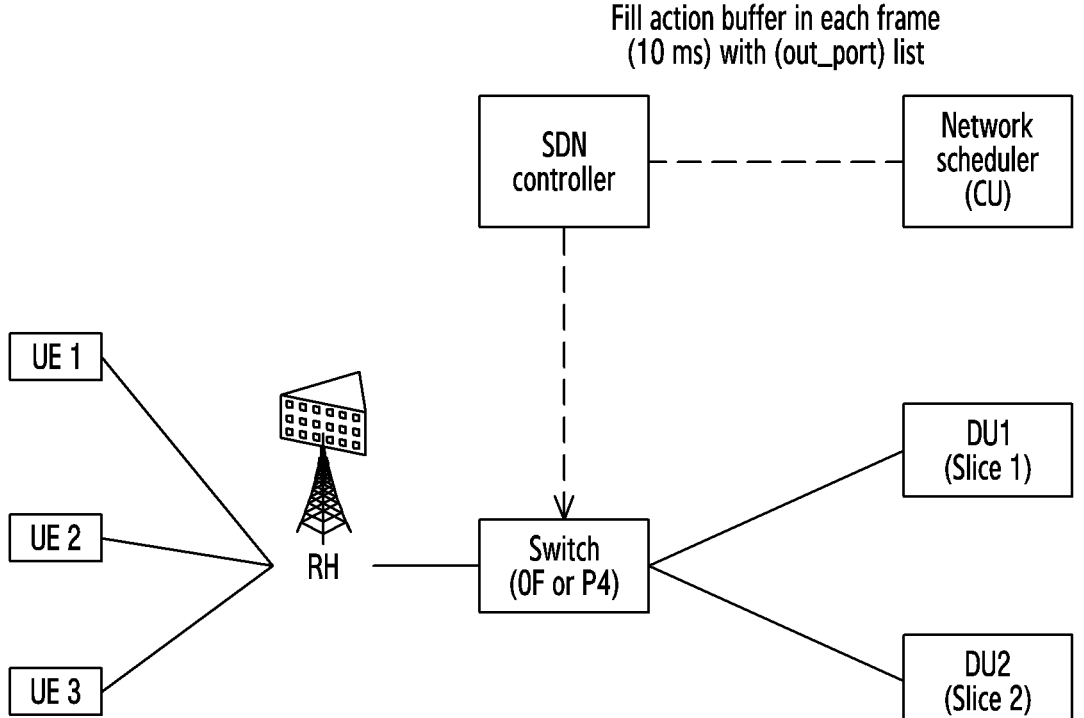
FIG. 12 illustrates a connection relationship between a radio head unit (RHU) and a distributed unit (DU) according to an embodiment of the disclosure.

FIG. 12 illustrates a connection relationship between an RHU and a distributed unit (DU) according to an embodiment of the disclosure.

Referring to FIG. 12, connection relationships between multiple RHUS and multiple DUs may be described. In a situation where multiple RHUs and multiple DUs exist, actions for forwarding as many packets as the number of RHUs in one subframe may need to be changed. In an embodiment of the disclosure, it may be configured that, in a situation where three terminals are connected to two DUs via a radio head (RH) to receive a wireless communication service, an SDN switch is installed between the RHs and DUs so as to forward uplink packets of each terminal to a corresponding DU.

In a network configuration including an SDN switch, the SDN switch may need to modify a forwarding rule in each subframe unit. For example, the SDN switch may need to modify only a forwarding action without modifying a filter that specifies a packet. In an embodiment of the disclosure, by referring to scheduling of radio resources determined by a CU, it may be specified which terminal has generated uplink traffic occurring in a corresponding subframe, and a DU to which a corresponding packet needs to be transferred may be selected. In the method of packet processing by the SDN switch in the aforementioned procedure, the operations of applying an actual forwarding action, and installing and managing an action buffer in the aforementioned embodiments may be applied.

[Fifth Embodiment]—Applying Indirect Action in
P4-Based ASIC Device

P4 (protocol independent packet processor) may refer to a programming language for controlling hardware, such as a switch for packet processing. A hardware device supporting P4, such as Tofino ASIC and BMv2, may execute a program written in P4 after changing the program to binary codes via a dedicated compiler. A P4 program may be advantageous in that, before compilation, a program for packet processing can be written using the same language.

For packet processing, the P4 language may enable packet processing using a pipeline including at least one of an egress parser, a queue, an ingress match action unit (MAU), or a parser in a large classification. The parser may perform at least one of header extraction from a packet or metadata generation. Head field information and metadata generated via the parser may be referenced in a subsequent operation of the pipeline so as to be used to perform match. The MAU may refer to a unit that performs an actual match-action operation on a packet, and may be divided into an ingress MAU and an egress MAU depending on a location. However, the ingress MAU and the egress MAU may have commonality in view of performing match-action on an input packet. For a packet processed in the ingress MAU, at least one of an output port or an action to be performed may be determined, and the packet may be stored in a queue so as to be transferred to a corresponding egress MAU.

FIG. 13 illustrates an embodiment of P4 language programming for an action according to an embodiment of the disclosure.

Referring to FIG. 13, an example of P4 language programming for an action may be described, and the example of P4 language programming of FIG. 13 may be described with reference to the P16 standard specification document. During processing in an MAU, at least one of modifying a packet header, controlling an output port, or adding a header may be performed by applying a user-defined action using a P4 language. In addition, functions provided autonomously by hardware may be referred to as initial actions, and operations may be performed by simply calling the actions without a user separately declaring or additionally defining the actions.

The P4 program may define an action named as add_mTag. In this case, up1, up2, down1, and down2 may be received as elements. When the action is called, a header declared as mtag may be added to an outermost header of the packet. In addition, by executing a series of modify_field for changing fields below, the action of adding a header for the newly added mtag to operate may finally be performed. modify_field used in the aforementioned procedure may correspond to an initial action.

FIG. 14 illustrates an embodiment of P4 language programming for an action according to an embodiment of the disclosure.

Referring to FIG. 14, codes for execution of an indirect action may be described. The disclosure includes a method and a device for using an indirect action as a part of initial actions. An indirect action may define an action provided directly in an environment or from hardware. In the disclosure, the indirect action may be referred to as Indirect_action.

In the codes for execution of the indirect action, it may be explicitly declared to use Indirect_action as the initial action, and it may be declared to call Indirect_action during defining the initial action as an actual action. When Indirect_action is called, Indirect_action may serve to read a buffer value from the action buffer described above in another embodiment and write the buffer value in metadata named as metadata.egress_spec. Here, metadata.egress_spec may refer to a port number where a corresponding packet should be output. In the disclosure, two elements, indirect_action_buffer_id and indireict_action_target, may be added and used to pass, in the form of metadata, a creation ID of the action buffer and a target to which a value in the buffer is applied. The aforementioned elements may be referenced during performing the indirect action. In the aforementioned procedure, a method of transferring Indirect_Action (buffer1, metadata.egress_sepc) as an element without using metadata may be used.

Due to using the codes for execution of the indirect action, instead of actions being executed directly in the P4 program, Indirect_action is called once, and actions required to be performed during a corresponding procedure may be read from the action buffer and used. Via the series of modifications described above, the indirect action may be used in P4. Definition of an action buffer that may be used in P4 may be designed and provided by a manufacturer, or may be designed and implemented via a separate hardware program.

According to various embodiments of the disclosure, a method performed by a first network entity in a wireless communication system may include: receiving, from a second network entity, a first message including information on at least one of a type, a size, or an identifier of an action buffer, which is for creating of the action buffer, receiving, from the second network entity, a second message including the identifier for adding of at least one action to multiple memories assigned to the action buffer created based on the first message, and based on an address of memory in which an arbitrary action among the at least one action is stored, performing the arbitrary action stored in the memory with respect to an input packet.

In an embodiment of the disclosure, the first message may further include information indicating an operation of a case that the multiple memories assigned to the action buffer are full, and the operation may include at least one of ignoring the at least one action, or removing one of an action stored longest in the action buffer or an action most recently stored in the action buffer.

In an embodiment of the disclosure, the first message may further include information indicating an operation of a case that there is no action stored in the memory, and the operation may include at least one of dropping the input packet, performing a preconfigured default action, waiting, or requesting, from the second network entity, an indication for processing the input packet.

In an embodiment of the disclosure, the method may further include receiving, from the second network entity, a third message indicating at least one of adding, removing, or modifying a flow entry, wherein the flow entry includes a match field and at least one instruction field, the first network entity is a software defined network (SDN) switch, the second network entity is an SDN controller, and the first network and the second network are connected via an SDN protocol.

In an embodiment of the disclosure, the method may further include receiving, from the second network entity, a fourth message including configuration information of a flow rule, wherein the flow rule includes a packet detection rule (PDR) field and an indirect action rule (IAR) field, the first network entity is a user plane function (UPF), the second network entity is a session management function (SMF), and the first network and the second network are connected via a packet forwarding control protocol (PFCP).

According to various embodiments of the disclosure, a method performed by a second network entity in a wireless communication system may include: transmitting, to a first network entity, a first message including information on at least one of a type, a size, or an identifier of an action buffer, which is for creating of the action buffer, and transmitting, to the first network entity, a second message including the identifier for adding of at least one action to multiple memories assigned to the action buffer created based on the first message.

In an embodiment of the disclosure, the first message may further include information indicating an operation of a case that the multiple memories assigned to the action buffer are full, and the operation may include at least one of ignoring the at least one action, or removing one of an action stored longest in the action buffer or an action most recently stored in the action buffer.

In an embodiment of the disclosure, the first message may further include information indicating an operation of a case that there is no action stored in the memory, and the operation may include at least one of dropping the input packet, performing a preconfigured default action, waiting, or requesting, from the second network entity, an indication for processing the input packet.

In an embodiment of the disclosure, the method may further include transmitting, to the first network entity, a third message indicating at least one of adding, removing, or modifying a flow entry, wherein the flow entry includes a match field and at least one instruction field, the first network entity is a software defined network (SDN) switch, the second network entity is an SDN controller, and the first network and the second network are connected via an SDN protocol.

In an embodiment of the disclosure, the method may further include transmitting, to the first network entity, a fourth message including configuration information of a flow rule, wherein the flow rule includes a packet detection rule (PDR) field and an indirect action rule (IAR) field, the first network entity is a user plane function (UPF), the second network entity is a session management function (SMF), and the first network and the second network are connected via a packet forwarding control protocol (PFCP).

According to various embodiments of the disclosure, a first network entity in a wireless communication system may include at least one transceiver, and at least one processor functionally coupled to the at least one transceiver, wherein the at least one processor is configured to receive, from a second network entity, a first message including information on at least one of a type, a size, or an identifier of an action buffer, which is for creating of the action buffer, receive, from the second network entity, a second message including the identifier for adding of at least one action to multiple memories assigned to the action buffer created based on the first message, and based on an address of memory in which an arbitrary action among the at least one action is stored, perform the arbitrary action stored in the memory with respect to an input packet.

In an embodiment of the disclosure, the first message may further include information indicating an operation of a case that the multiple memories assigned to the action buffer are full, and the operation may include at least one of ignoring the at least one action, or removing one of an action stored longest in the action buffer or an action most recently stored in the action buffer.

In an embodiment of the disclosure, the first message may further include information indicating an operation of a case that there is no action stored in the memory, and the operation may include at least one of dropping the input packet, performing a preconfigured default action, waiting, or requesting, from the second network entity, an indication for processing the input packet.

In an embodiment of the disclosure, the at least one processor may be further configured to receive, from the second network entity, a third message indicating at least one of adding, removing, or modifying a flow entry, wherein the flow entry includes a match field and at least one instruction field, the first network entity is a software defined network (SDN) switch, the second network entity is an SDN controller, and the first network and the second network are connected via an SDN protocol.

In an embodiment of the disclosure, the at least one processor may be further configured to receive, from the second network entity, a fourth message including configuration information of a flow rule, wherein the flow rule includes a packet detection rule (PDR) field and an indirect action rule (IAR) field, the first network entity is a user plane function (UPF), the second network entity is a session management function (SMF), and the first network and the second network are connected via a packet forwarding control protocol (PFCP).

According to various embodiments of the disclosure, a second network entity in a wireless communication system may include at least one transceiver, and at least one processor functionally coupled to the at least one transceiver, wherein the at least one processor is configured to transmit, to a first network entity, a first message including information on at least one of a type, a size, or an identifier of an action buffer, which is for creating of the action buffer, and transmit, to the first network entity, a second message including the identifier for adding of at least one action to multiple memories assigned to the action buffer created based on the first message.

In an embodiment of the disclosure, the first message may further include information indicating an operation of a case that the multiple memories assigned to the action buffer are full, and the operation may include at least one of ignoring the at least one action, or removing one of an action stored longest in the action buffer or an action most recently stored in the action buffer.

In an embodiment of the disclosure, the first message may further include information indicating an operation of a case that there is no action stored in the memory, and the operation may include at least one of dropping the input packet, performing a preconfigured default action, waiting, or requesting, from the second network entity, an indication for processing the input packet.

In an embodiment of the disclosure, the at least one processor may be further configured to transmit, to the first network entity, a third message indicating at least one of adding, removing, or modifying a flow entry, wherein the flow entry includes a match field and at least one instruction field, the first network entity is a software defined network (SDN) switch, the second network entity is an SDN controller, and the first network and the second network are connected via an SDN protocol.

In an embodiment of the disclosure, the at least one processor may be further configured to transmit, to the first network entity, a fourth message including configuration information of a flow rule, wherein the flow rule includes a packet detection rule (PDR) field and an indirect action rule (IAR) field, the first network entity is a user plane function (UPF), the second network entity is a session management function (SMF), and the first network and the second network are connected via a packet forwarding control protocol (PFCP).

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to random access memory, non-volatile memory including flash memory, read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to memory combining part or all of those recording media. A plurality of memories may be included.

In addition, the program may be stored in an attachable storage device accessible via a communication network, such as Internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first network entity in a wireless communication system, the method comprising:
   receiving, from a second network entity, a first message including first information for generating an action buffer, wherein the first information includes at least one of a type of the action buffer, a size of the action buffer, or an identifier of the action buffer;
   receiving, from the second network entity, a second message including second information for adding of at least one action to multiple memories assigned to the action buffer created based on the first information; and
   performing an action corresponding to an address of memory for an input packet, wherein the action among the at least one action is stored in the memory.

2. The method of claim 1,
   wherein the first information further includes information indicating an operation in case that the multiple memories assigned to the action buffer are full, and
   wherein the operation includes at least one of ignoring the at least one action, removing an action stored longest in the action buffer, or removing an action most recently stored in the action buffer.

3. The method of claim 1,
   wherein the first information further includes information indicating an operation in case that the multiple memories assigned to the action buffer are empty, and
   wherein the operation includes at least one of dropping the input packet, performing a preconfigured default action, waiting, or requesting, to the second network entity, an indication for processing the input packet.

4. The method of claim 1, further comprising:
   receiving, from the second network entity, a third message indicating at least one of adding, removing, or modifying a flow entry,
   wherein the flow entry includes a match field and at least one instruction field,
   wherein the first network entity is a software defined network (SDN) switch,
   wherein the second network entity is an SDN controller, and
   wherein the first network entity and the second network entity are connected via an SDN protocol.

5. The method of claim 1, further comprising:
   receiving, from the second network entity, a fourth message including configuration information on a flow rule,
   wherein the flow rule includes a packet detection rule (PDR) field and an indirect action rule (IAR) field,
   wherein the first network entity is a user plane function (UPF) entity,
   wherein the second network entity is a session management function (SMF) entity, and
   wherein the first network entity and the second network entity are connected via a packet forwarding control protocol (PFCP).

6. A method performed by a second network entity in a wireless communication system, the method comprising:
   transmitting, to a first network entity, a first message including first information for generating an action buffer, wherein the first information includes at least one of a type of the action buffer, a size of the action buffer, or an identifier of the action buffer; and
   transmitting, to the first network entity, a second message including second information for adding of at least one action to multiple memories assigned to the action buffer created based on the first information,
   wherein, an action corresponding to an address of memory for an input packet, wherein the arbitrary action among the at least one action is stored in the memory.

7. The method of claim 6,
   wherein the first information further includes information indicating an operation in case that the multiple memories assigned to the action buffer are full, and
   wherein the operation includes at least one of ignoring the at least one action, removing an action stored longest in the action buffer, or removing an action most recently stored in the action buffer.

8. The method of claim 6,
   wherein the first information further includes information indicating an operation in case that the multiple memories assigned to the action buffer are empty, and
   wherein the operation includes at least one of dropping the input packet, performing a preconfigured default action, waiting, or requesting to the second network entity an indication for processing the input packet.

9. The method of claim 6, further comprising:
   transmitting, to the first network entity, a third message indicating at least one of adding, removing, or modifying a flow entry, wherein the flow entry includes a match field and at least one instruction field, wherein the first network entity is a software defined network (SDN) switch, wherein the second network entity is an SDN controller, and wherein the first network entity and the second network entity are connected via an SDN protocol.

10. The method of claim 6, further comprising:

transmitting, to the first network entity, a fourth message including configuration information on a flow rule, wherein the flow rule includes a packet detection rule (PDR) field and an indirect action rule (IAR) field, wherein the first network entity is a user plane function (UPF) entity, wherein the second network entity is a session management function (SMF) entity, and wherein the first network entity and the second network entity are connected via a packet forwarding control protocol (PFCP).

11. A first network entity comprising:

at least one processor; and at least one memory, communicatively coupled to the at least one processor, storing instructions executable by the at least one processor individually or in any combination to cause the first network entity to:

receive, from a second network entity, a first message including first information for generating an action buffer, wherein the first information includes at least one of a type of the action buffer, a size of the action buffer, or an identifier of the action buffer, receive, from the second network entity, a second message including second information for adding of at least one action to multiple memories assigned to the action buffer created based on the first information, and perform an action corresponding to an address of memory for an input packet, wherein the action among the at least one action is stored in the memory.

12. The first network entity of claim 11, wherein the first information further includes information indicating an operation in case that the multiple memories assigned to the action buffer are full, and wherein the operation includes at least one of ignoring the at least one action, removing an action stored longest in the action buffer, or removing an action most recently stored in the action buffer.

13. The first network entity of claim 11, wherein the first information further includes information indicating an operation in case that the multiple memories assigned to the action buffer are empty, and wherein the operation includes at least one of dropping the input packet, performing a preconfigured default action, waiting, or requesting, to the second network entity, an indication for processing the input packet.

14. The first network entity of claim 11, wherein the instructions further cause the first network entity to:

receive, from the second network entity, a third message indicating at least one of adding, removing, or modifying a flow entry, wherein the flow entry includes a match field and at least one instruction field, wherein the first network entity is a software defined network (SDN) switch, wherein the second network entity is an SDN controller, and wherein the first network entity and the second network entity are connected via an SDN protocol.

15. The first network entity of claim 11, wherein the instructions further cause the first network entity to:

receive, from the second network entity, a fourth message including configuration information on a flow rule, wherein the flow rule includes a packet detection rule (PDR) field and an indirect action rule (IAR) field, wherein the first network entity is a user plane function (UPF) entity, wherein the second network entity is a session management function (SMF) entity, and wherein the first network entity and the second network entity are connected via a packet forwarding control protocol (PFCP).

16. A second network entity comprising:

at least one processor; and at least one memory, communicatively coupled to the at least one processor, storing instructions executable by the at least one processor individually or in any combination to cause the second network entity to:

transmit, to a first network entity, a first message including first information for generating an action buffer, wherein the first information includes at least one of a type of the action buffer, a size of the action buffer, or an identifier of the action buffer, and transmit, to the first network entity, a second message including second information for adding of at least one action to multiple memories assigned to the action buffer created based on the first information, and wherein, an action corresponding to an address of memory for an input packet, wherein the action among the at least one action is stored in the memory.

17. The second network entity of claim 16, wherein the first information further includes information indicating an operation in case that the multiple memories assigned to the action buffer are full, and wherein the operation includes at least one of ignoring the at least one action, removing an action stored longest in the action buffer, or removing an action most recently stored in the action buffer.

18. The second network entity of claim 16, wherein the first information further includes information indicating an operation in case that the multiple memories assigned to the action buffer are empty, and wherein the operation includes at least one of dropping the input packet, performing a preconfigured default action, waiting, or requesting to the second network entity an indication for processing the input packet.

19. The second network entity of claim 16, wherein the instructions further cause the second network entity to:

transmit, to the first network entity, a third message indicating at least one of adding, removing, or modifying a flow entry, wherein the flow entry includes a match field and at least one instruction field, wherein the first network entity is a software defined network (SDN) switch, wherein the second network entity is an SDN controller, and wherein the first network entity and the second network entity are connected via an SDN protocol.

20. The second network entity of claim 16, wherein the instructions further cause the second network entity to:

transmit, to the first network entity, a fourth message including configuration information on a flow rule, wherein the flow rule includes a packet detection rule (PDR) field and an indirect action rule (IAR) field, wherein the first network entity is a user plane function (UPF) entity, wherein the second network entity is a session management function (SMF) entity, and wherein the first network entity and the second network entity are connected via a packet forwarding control protocol (PFCP).

* * * * *